United States Patent Office 2,759,795
Patented Aug. 21, 1956

2,759,795

DEFLUORINATION OF PHOSPHATIC MATERIALS

James R. Archer, East Point, Ga., assignor to International Minerals & Chemical Corporation, a corporation of New York No Drawing. Application September 26, 1950,
Serial No. 186,900

10 Claims. (Cl. 23—109)

This invention relates to processes for the defluorination of phosphatic materials and more particularly to processes for producing high-grade calcium phosphates, which are substantially free of fluorine, from acidulated phosphatic materials.

Fluorine is a constituent in practically all native phosphatic material, such as phosphate rock, the amount varying in the different areas in which it occurs. For example, Florida phosphate rock usually contains between 3.5% and 4.0% of fluorine. When phosphate rock comprising essentially tricalcium phosphate is acidulated with an acid such as sulfuric acid, superphosphate, which comprises essentially monocalcium orthophosphate and orthophosphoric acid, is obtained and is used as a fertilizer component. When monocalcium orthophosphate is treated with lime, dicalcium orthophosphate is formed.

Research on the nutrition of animals, particularly poultry, has demonstrated that high-grade dicalcium orthophosphate is a superior form of calcium-phosphorus mineral feed supplement. However, dicalcium orthophosphate for feed purposes should not contain more than .05% fluorine. Thus to produce a feed grade dicalcium orthophosphate, fluorine must be removed from the acidulated phosphate rock.

The animal feeds containing dicalcium orthophosphate which are commercially available at the present time, often have a high fluorine content and are not of a uniform analysis. Researchers have worked on this problem of fluorine removal for many years without too much practical success. The problem is unusually difficult since the fluorine ions are believed to be present as complexes with the phosphate and tend to be removed with any phosphate chemical prepared. Procedures have been devised for removing fluorine in various amounts; however, the known processes are often not commercially feasible and leave much to be desired. Most of the commercial processes involve heating the superphosphate to remove fluorine. In many cases the conditions employed for heating cause chemical changes such as the conversion of orthophosphate to meta- and pyrophosphate. Unlike the orthophosphate, the meta- and the pyrophosphates are insoluble and unavailable forms of phosphate, and for this reason it is undesirable to convert the orthophosphate to these unavailable phosphates. For example, in practice superphosphate is heated in an air-steam atmosphere at temperatures of about 360° to 500° C., and a product containing about 0.4% fluorine is obtained. Increased temperatures will increase the amount of fluorine removed, and at about 700° C. 90% of the fluorine is removed. However, heating at a temperature above about 200° C. causes the conversion of orthophosphate to the above mentioned water-insoluble and unavailable meta- and pyrophosphates. Thus, in preparing fertilizers and feed materials in which it is desired to obtain high $P_2O_5$ availability, heating at temperatures above about 200° C. is to be avoided. In the past, it has usually been necessary to heat superphosphate at temperatures higher than 200° C. in order to obtain products of a sufficiently low fluorine content to approach the specifications of users.

It is an object of the present invention to produce high-grade phosphatic materials of low fluorine content and suitable for use as fertilizer components and animal feed supplements.

It is a further object of the invention to produce calcium orthophosphates having a low fluorine content and suitable for use as fertilizer components and animal feed supplements.

It is a further object to produce a high-grade calcium orthophosphate suitable for use as a fertilizer component and an animal feed supplement from low-grade phosphate rock as a starting material and to do so in a simple operation with low capital investment.

Other objects of the invention will become apparent from a fuller understanding of the instant novel process as more fully described hereinafter.

It has been discovered that when an aqueous solution comprising essentially monocalcium orthophosphate and orthophosphoric acid, and having a $CaO/P_2O_5$ mole ratio of less than about 0.60, is heated at between about 100° and about 200° C., appreciable amounts of fluorine are removed. A decrease in the $CaO/P_2O_5$ mole ratio increases the percentage of fluorine removed from the aqueous solution when it is heated. At any constant mole ratio, the percentage of fluorine removed is increased by heating at higher temperatures, such as between about 130° and about 180° C., and for longer periods of time, such as between about one and about three hours.

Without intending to limit the invention in any way it is believed that the theory upon which this method of fluorine elimination is based is the following equilibrium reaction:

$$H_3PO_4 + HF \rightleftharpoons H_2PO_3F + H_2O$$

Hydrofluoric acid can be readily distilled while monofluorophosphoric acid has not as yet been successfully distilled even at high temperatures and at reduced pressures. Thus, it is desirable to have fluorine present in the form of hydrofluoric acid rather than as monofluorophosphoric acid. An increase in temperature causes a shift of the equilibrium to the left, while removal of water causes the reaction to proceed to the right. Thus, heating a dilute phosphate solution effects fluorine removal much more completely than the old processes of heating superphosphate in the presence of steam.

The aqueous phosphate solution which is to be heated to defluorinate the same is successfully defluorinated if its $P_2O_5$ concentration is between about 5.0% and about 45.0%. However, an aqueous solution containing between about 12% and about 30% by weight of $P_2O_5$ is preferred.

The aqueous phosphate solution may be prepared by water leaching or extracting monocalcium orthophosphate and orthophosphoric acid from acidulated phosphatic material such as superphosphate, triple superphosphate, or similar phosphatic materials containing water-soluble phosphatic components. By the term "acidulated phosphatic material," as used herein, is meant material comprising essentially monocalcium orthophosphate and orthophosphoric acid, and which is usually obtained by decomposing phosphate rock with an acid such as sulfuric acid. Water, dilute orthophosphoric acid, a previously prepared aqueous leach solution, or an aqueous solution containing leach solution and water may be used to extract or leach the water-soluble values from the phosphatic material. In an application of the process, acidulated Florida phosphatic material containing between about 94% and about 97% of its $P_2O_5$ content in a water-soluble form, and comprising essentially monocalcium orthophosphate and orthophosphoric acid, is leached with sufficient water to obtain a solution containing between about 12% and about 30% by weight of $P_2O_5$. The $CaO/P_2O_5$ mole ratio of this leach solution is about 0.85 and is adjusted to a mole ratio of less than about 0.60 in any convenient manner. It has been found that if other variables are kept constant the percent fluorine removed is correlated with the $CaO/P_2O_5$ mole ratio. The lower the mole ratio the larger the percent of fluorine removed from the phosphate solution. Also, at any given mole ratio the percent fluorine which is removed increases as the time of heating and as the temperature is increased. It is preferable to use a $CaO/P_2O_5$ mole ratio between about 0.1 and about 0.6, preferably 0.3 to 0.5, and to heat at temperatures of between about 100° and about 200° C., preferably of between about 150° and about 180° C. for several hours, preferably between about one and about three hours.

Table I shows the analysis of a dried extract prepared from acidulated Florida phosphate rock corresponding to various $CaO/P_2O_5$ mole ratios. In each case the extract solution was dried at about 177° C. in a dryer in which heating was accomplished by maintaining a jacket filled with heated oil. The dryer was also equipped with four paddles which turned at about 60 r. p. m. The mixture was kept in motion so that solids would not form on the heating surface. This data demonstrates that a larger percentage of fluorine is removed from the phosphatic material by heating an aqueous solution having a mole ratio of about 0.3 than by heating one having a mole ratio of about 0.65.

TABLE I

| Analysis of Dried Extract | $CaO/P_2O_5$ Mole Ratio | | |
|---|---|---|---|
| | 0.30 | 0.50 | 0.65 |
| Total $P_2O_5$ | 61.77 | 67.5 | 58.41 |
| Available $P_2O_5$ | 61.24 | 62.48 | 58.35 |
| Water-Soluble $P_2O_5$ | 56.45 | 59.05 | 52.32 |
| Percent Fluorine | 0.04 | 0.04 | 0.10 |
| Percent Fluorine Removed | 92.60 | 91.70 | 79.80 |

Extract prepared from phosphatic materials from different sources will contain varying amounts of fluorine and the $CaO/P_2O_5$ ratio is adjusted so as to remove upon further treatment sufficient fluorine to obtain a product of the desired purity. For example, extract prepared from acidulated Tennessee phosphate rock has a higher percent fluorine as an impurity than extract prepared from acidulated Florida phosphate rock. In order to obtain a product of sufficiently low fluorine content from extract prepared from acidulated Tennessee phosphate rock, it is necessary to remove a larger percentage of fluorine. In such an instance, the $CaO/P_2O_5$ mole ratio is usually adjusted to less than between about 0.15 and 0.3. When using an extract prepared from acidulated Florida phosphate rock, the mole ratio is adjusted to less than about 0.5 to give a final product having substantially the same percent of fluorine as contained in the Tennessee product.

Sulfuric acid is generally used to adjust the $CaO/P_2O_5$ mole ratio, and the calcium sulfate formed is removed prior to further treatment. If desired, other reagents such as phosphoric acid may be used to adjust this $CaO/P_2O_5$ mole ratio.

The percentage fluorine removed is also regulated by controlling the temperature at which the extract is heated and the length of time during which the extract is heated. Table II indicates the percentage fluorine removed from extract solution prepared from acidulated Florida phosphate rock having a $CaO/P_2O_5$ mole ratio of about 0.1, when aliquots of the solution were heated at the indicated temperatures and held at these temperatures for various lengths of time.

TABLE II

| Time (Hrs.) | Temperature, °C. | Percent Fluorine Removed |
|---|---|---|
| 1 | 115 | 74.6 |
| 1 | 130 | 90.0 |
| 1 | 145 | 92.5 |
| 1 | 160 | 95.5 |
| 2½ | 115 | 87.6 |
| 2½ | 130 | 96.0 |
| 2½ | 140 | 97.5 |
| 2½ | 160 | 97.2 |

The percent fluorine removed was increased by heating at the higher temperatures, and at any of the given temperatures, the fluorine removed was increased by increasing the length of time which it was heated.

Thus, by controlling the $CaO/P_2O_5$ mole ratio, the temperature, and the time of heating, the percentage of fluorine removed is regulated. For feed purposes it is desirable that the product contain less than about .05% fluorine. Satisfactory results are also obtainable by heating at lower temperatures for longer periods of time. If higher temperatures are employed a product containing less than .05% fluorine can be obtained by heating for shorter periods of time. For example, such a product is obtained by heating the above extract at 175° C. for five minutes. On the other hand, when extract prepared from acidulated Tennessee phosphate rock, having a mole ratio of about 0.15, is defluorinated a product containing less than 0.05% fluorine can be obtained by heating at 175° C. for about one hour or at about 160° C. for about two hours.

The heating of the extract can be carried out in an evaporator, a rotary dryer, or any other conventional heating equipment. In one embodiment, the extract solution, prepared from acidulated Florida phosphate rock and having a mole ratio of about 0.5, is heated in an evaporator to the desired temperature and held at that temperature for the desired length of time. Heating at about 160° C. for about one hour is usually satisfactory. In another embodiment a rotary dryer is employed. For example, an extract solution prepared from acidulated Florida phosphate rock, having a mole ratio of about 0.5 and a $P_2O_5$ concentration of about 15%, is passed through a rotary dryer. The dried product contains between about 60% and about 65% $P_2O_5$ and about .04% fluorine. This product can be used directly as a fertilizer component. By adding lime either in solution, slurry, or in dry form to this product a dicalcium orthophosphate feed can be produced which contains 45% available $P_2O_5$ and only about .03% fluorine. This is a lower fluorine content than is required to meet specifications for feed purposes.

In another example of the instant novel process, extract is prepared from raw phosphatic material, comprising essentially tricalcium phosphate or its mineral equivalent, by mixing with 41° to 55° Bé. at 160° C., sulfuric acid in the amount of between about 101% and about 120% by weight of that theoretically required to convert all of the $P_2O_5$ content of the raw phosphatic material to monocalcium orthophosphate and to react with the impurities of the phosphatic material. After vigorous mixing for about one minute the mixture is allowed to partially harden and then is sent to a storage pile where it is stored for several days. The agitated material is then ground and agitated with sufficient water, dilute aqueous orthophosphoric acid, a previously prepared aqueous leach solution, or a solution containing previously prepared aqueous leach solution and water, to obtain a solution containing between about 12% and about 30% by weight of $P_2O_5$. The agitation is for a short period of time, usually between about five and about fifteen minutes being ample, either while hot or while under atmospheric temperature, preferably while hot. The aqueous extract solution is then separated from the solids, and the solids are discarded. The solids may be separated in any convenient manner such as by filtration, countercurrent decantation, cyclone separation, or by centrifuging. The solid material discarded contains only about 2.5% total $P_2O_5$, only about half of which is available $P_2O_5$. The solid residue discarded is largely calcium sulfate.

Alternately, the extract solution is prepared by reacting phosphatic material such as Florida pebble phosphate rock with up to about 20% excess sulfuric acid, and before setting takes place the mixture is diluted and the slurry is agitated for between about three and about twelve hours or until the reaction is essentially complete. While agitating the reaction mixture as initially formed it should contain about 65% solids, but may range between about 45% and about 70% solids. As the reaction approaches completion the slurry is diluted by adding water, aqueous leach solution, or a solution containing aqueous leach solution and water to obtain a slurry containing between about 30% and about 45% solids. The solids are then separated from the extract solution and discarded. These methods of preparing phosphate extract solutions are described and claimed in application Serial No. 151,728, filed March 24, 1950, now forfeited, and its copending continuation-in-part, Serial No. 511,624 filed May 27, 1955. The aqueous extract solution is also prepared by adding aqueous phosphoric acid to dicalcium phosphate or from any other convenient fluorine-containing phosphatic material and in any suitable and convenient manner.

The above described extract solution is then adjusted to the heretofore described mole ratio with sulfuric acid. The calcium sulfate formed by the addition of sulfuric acid is removed from the solution, and the solution is evaporated or dried, in a rotary dryer, to remove fluorine. The dried defluorinated material is granular and may be shipped as fertilizer or subsequently treated with lime to obtain dicalcium orthophosphate which is suitable for use as an animal feed material.

In one embodiment of the process, extract prepared from Florida phosphate rock as above described and having a mole ratio of about 0.85, is added with sulfuric acid to a mixing tank at a constant rate. Sufficient sulfuric acid is added so that the $CaO/P_2O_5$ mole ratio of the extract is reduced to about 0.5. The slurry formed overflows by gravity into a thickener. The calcium sulfate settles in the thickener, and the extract overflows from the thickener to a dryer. The underflow from the thickener is recirculated to the extraction step. The extract which enters the dryer contains about 18% $P_2O_5$. The dried product is a mixture of monocalcium orthophosphate and orthophosphoric acid and is hygroscopic. Analysis of a typical product which has been dried at 160° C. is as follows:

| | Percent |
|---|---|
| $P_2O_5$ | 62 |
| Calcium oxide | 11.7 |
| Fluorine | .05 |

If it is desired to prepare dicalcium orthophosphate, the dried defluorinated product is conducted to a mixer where water and calcium oxide are added. The reaction which takes place is exothermic, and will evaporate some or all of the water added with the lime and the volume of water added can be controlled so that substantially all of the water added is evaporated in the reaction. Analysis of dicalcium orthophosphate produced by diluting the dried extract with water to obtain a slurry containing about 54% by weight $P_2O_5$, liming to a $CaO/P_2O_5$ mole ratio of about 1.64, and drying the product is as follows:

| | Percent |
|---|---|
| $P_2O_5$ | 49.6 |
| Calcium oxide | 9.85 |
| Available $P_2O_5$ | 49.0 |
| Water-soluble $P_2O_5$ | 24.1 |

If the product from the dryer is limed to a $CaO/P_2O_5$ mole ratio of about 2.0, the product will contain less than 45% $P_2O_5$.

In another embodiment of the instant process, the defluorinated material discharged from the dryer is placed in a mixer with sufficient water to obtain about a 30% solids solution and is agitated for several hours. The process can be continuous. At the end of about eight hours about 90% to 95% of the $P_2O_5$ is in solution. The solids are separated from the solution and returned to the process. Lime is added to the solution to obtain a pH of about 5.0 and dicalcium orthophosphate is separated from the solution and dried.

The extract may also be defluorinated by heating in an evaporator or in a series of evaporators. For example, the extract which overflows from the thickener, and which has a $CaO/P_2O_5$ mole ratio of about 0.5, can be sent to a direct fired evaporator or a pair of such evaporators. The retention time for the solution in the evaporator, or in the series of evaporators, is about one hour and the extract is heated to about 160° C. The solution is constantly agitated so that the solid material which forms on heating will not deposit onto the heating surfaces. The slurry from the evaporator then flows to a dilution tank where sufficient water is added to obtain between about a 55% and about a 60% $P_2O_5$ solution. The desired amount of calcium oxide is added, and dicalcium orthophosphate containing between about 45% and 50% $P_2O_5$ is obtained.

In still another embodiment, the extract solution prepared from acidulated Florida phosphate rock is cooled to about 15° C., and lime is added to precipitate dicalcium orthophosphate which has a high fluorine concentration. The dicalcium orthophosphate is removed from the solution. Sufficient sulfuric acid is added to the resultant solution to adjust to the desired $CaO/P_2O_5$ mole ratio, and calcium sulfate is removed from the solution. The resultant solution is then evaporated or heated as heretofore described to remove fluorine. Lime or calcium carbonate is added to yield the $CaO/P_2O_5$ mole ratio of between about 1.6 and about 2.0, and the dicalcium orthophosphate formed is dried.

As specific examples of the process, the following serve merely as illustrations and it is not intended that the scope of the invention be limited thereto.

*Example I*

Sufficient sulfuric acid is added to two samples of extract prepared by leaching sulfuric acid acidulated Florida phosphate rock with water and of analysis 17.25% $P_2O_5$, 5.45% calcium oxide, and 0.236% fluorine to adjust the first sample to a $CaO/P_2O_5$ mole ratio of about 0.4 and the second to a $CaO/P_2O_5$ mole ratio of about 0.2. The calcium sulfate formed is removed. The resulting solutions were heated at about 175° C. for about thirty minutes. The analysis of the heated material from the extract having a $CaO/P_2O_5$ mole ratio of about 0.4 is as follows: 65.46% total $P_2O_5$, 8.77% calcium oxide, and 0.086% fluorine. The analysis of the heated material from the extract having a $CaO/P_2O_5$ mole ratio of about 0.2 is as follows: 51.13% total $P_2O_5$, 3.33% calcium oxide, and 0.011% fluorine.

*Example II*

Sulfuric acid is added to samples of extract solution, prepared by leaching sulfuric acid acidulated Florida phosphate rock with water to adjust to various $CaO/P_2O_5$ mole ratios. The calcium sulfate formed is removed, and the resultant solutions concentrated at temperatures of about 175° C. and held at that temperature for about one hour. Table III indicates the percentage of fluorine removed from the samples at various $CaO/P_2O_5$ mole ratios.

TABLE III

| $CaO/P_2O_5$ Mole Ratio | Percent Fluorine Removed |
|---|---|
| 0.1 | 98.0 |
| 0.2 | 98.0 |
| 0.4 | 86.0 |
| 0.6 | 48.0 |

*Example III*

An aqueous extract solution, prepared by extracting the water-soluble values from sulfuric acid acidulated Florida phosphate, and having a $CaO/P_2O_5$ mole ratio of about 0.85, is added to a mixing tank at a rate of 2548 gallons per hour along with 70.22 gallons per hour of 100% sulfuric acid. The slurry formed overflows by gravity into a thickener. The extract solution which has a $CaO/P_2O_5$ mole ratio of about 0.5 overflows from the thickener and flows to a direct fired countercurrent rotary dryer. The underflow from the thickener is recirculated to the extraction step. The extract entering the dryer contains about 18% by weight of $P_2O_5$. The material is heated at about 160° C. for about one hour. The product from the dryer contains about 62% by weight of $P_2O_5$ and less than .05% fluorine. The product is a fine granular material which may be used as fertilizer.

To prepare an animal feed grade dicalcium orthophosphate from the defluorinated dried product, water is added to obtain a solution containing between about 55% and 60% $P_2O_5$. About 2221 pounds per hour of calcium oxide is mixed with this product to yield about 4.166 tons per hour of dicalcium orthophosphate having an analysis as follows:

| | Percent |
|---|---|
| Total $P_2O_5$ | 49.35 |
| Available $P_2O_5$ | 43.85 |
| Calcium oxide | 42.34 |
| Flourine | .041 |
| Aresenic trioxide | .0012 |
| Lead | .0018 |
| Moisture | .02 |

*Example IV*

Extract solution, prepared by leaching sulfuric acid acidulated Florida phosphate, and having a $CaO/P_2O_5$ mole ratio of about 0.85, is added to a mixing tank at a rate of about 2450 gallons per hour together with about 63.54 gallons per hour of 100% sulfuric acid to adjust the $CaO/P_2O_5$ mole ratio to about 0.5. The slurry overflows to a thickener. The extract solution overflows to a direct fired countercurrent rotary dryer. The underflow from the thickener is recirculated to the extraction step. The material from the dryer contains about 62% by weight of $P_2O_5$ and is largely water-soluble. The dried material is placed in a mixer with sufficient water to obtain about a 30% solids solution and is mixed for about eight hours. The mixture is conducted to a thickener where the solids are separated as underflow, and the solution overflows and is mixed with about 1614 pounds per hour of calcium oxide. The precipitate which forms is separated from the solution and dried in a rotary kiln to yield about 4.166 tons per hour or about 100 tons of product per day of dicalcium orthophosphate having the following analysis:

| | Percent |
|---|---|
| Total $P_2O_5$ | 44.4 |
| Available $P_2O_5$ | 42.7 |
| Calcium oxide | 55.3 |
| Fluorine | .037 |
| Arsenic trioxide | .0004 |
| Lead | .0001 |
| Moisture | 5.4 |

This product is of higher purity than that of Example III.

*Example V*

The aqueous extract solution from acidulated Florida phosphate rock is added to a mixing tank at the rate of about 2150 gallons per hour along with about 182 gallons per hour of 50% sulfuric acid to adjust the $CaO/P_2O_5$ mole ratio to about 0.5. The resultant slurry overflows to a centrifugal separator or a thickener where the calcium sulfate is removed from the extract. The extract is then sent to a direct fired evaporator where the solution is concentrated to a $P_2O_5$ content of about 36% by weight. The mixture from this evaporator then flows to a second evaporator. The retention time for the two evaporators is about one hour, and the solution is heated to about 160° C. and held at that temperature for the above length of time. Sufficient water is added to the evaporator product to obtain a slurry containing between about 55% and about 60% by weight of $P_2O_5$. After dilution about 1.14 tons per hour of calcium oxide or about 2.03 tons per hour of calcium carbonate is added to yield dicalcium orthophosphate, which upon drying contains about 45% by weight of $P_2O_5$ and less than about .05% fluorine.

Having fully described and illustrated the character of the invention, what is desired to be secured by Letters Patent is:

1. A process for defluorinating acid phosphate which comprises separating a solution having a $CaO/P_2O_5$ mole ratio in the range between about 0.1 and about 0.6 from the solid calcium sulfate of a slurry prepared by leaching a sulfuric acid-phosphate rock mix, the phosphate rock containing chemically bound fluorine, with a liquid selected from the group consisting of water and an aqueous solution comprising essentially water, monocalcium phosphate and free phosphoric acid, and heating said solution at a temperature between about 100° C. and about 200° C. to evolve fluorine constituents.

2. A process for defluorinating acidulated phosphatic material which comprises leaching the water-soluble phosphorus values from acidulated phosphatic material containing chemically bound calcium and fluorine with a liquid selected from the group consisting of water, dilute aqueous orthophosphoric acid, and an aqueous solution comprising essentially water, monocalcium phosphate and free orthophosphoric acid to obtain a solution of between about 12% and about 30% by weight of $P_2O_5$, adjusting the $CaO/P_2O_5$ mole ratio of the solution with sulfuric acid to between about 0.15 and about 0.6, removing calcium sulfate from the resultant solution, and heating the said solution at a temperature of between about 100° and about 200° C. for between about one and about three hours.

3. A process for defluorinating acidulated phosphatic material which comprises leaching the water-soluble phosphorus values from acidulated Florida phosphate rock containing chemically bound calcium and fluorine with a liquid selected from the group consisting of water, dilute aqueous orthophosphoric acid, and an aqueous solution comprising essentially water, monocalcium phosphate and free orthophosphoric acid to obtain a solution of between about 12% and about 30% by weight of $P_2O_5$, adjusting the $CaO/P_2O_5$ mole ratio of the solution with sulfuric acid to between about 0.15 and about 0.6, removing calcium sulfate from the resultant solution, and heating the said solution at a temperature of between about 100° and about 200° C. for between about one and about three hours.

4. A process for defluorinating acidulated phosphatic material which comprises leaching the water-soluble phosphorus values from aged, acidulated phosphatic material containing chemically bound calcium and fluorine with sufficient water to obtain an aqueous leach solution containing between about 12% and about 30% by weight of $P_2O_5$, adjusting the $CaO/P_2O_5$ mole ratio of the solution to between about 0.15 and about 0.6 with sulfuric acid, removing calcium sulfate from the resultant solution, and drying the said solution at a temperature between about 130° and about 180°.

5. A process for defluorinating acidulated phosphatic material which comprises leaching the water-soluble phosphorus values from aged, acidulated phosphatic material containing chemically bound calcium and fluorine with sufficient water to obtain a leach solution containing between about 12% and about 30% by weight of $P_2O_5$, adjusting the $CaO/P_2O_5$ mole ratio of the solution to between about 0.15 and about 0.6 with sulfuric acid, removing calcium sulfate from the resultant solution, and heating the resultant solution at a temperature of between about 130° and about 180° C. and maintaining said temperature for between about one and about three hours.

6. A process for defluorinating acidulated phosphatic material which comprises leaching the water-soluble phosphorus values from aged, acidulated Florida phosphate rock containing chemically bound calcium and fluorine with sufficient water to obtain a leach solution containing between about 12% and about 30% by weight of $P_2O_5$, adjusting the $CaO/P_2O_5$ mole ratio of the solution to between about 0.15 and about 0.6 with sulfuric acid, removing calcium sulfate from the resultant solution, and heating the resultant solution at a temperature of between about 130° and about 180° C. and maintaining said temperature for between about one and about three hours.

7. A process for producing feed grade dicalcium phosphate having a fluorine concentration of less than about .05% which comprises leaching the water-soluble phosphorus values from acidulated phosphatic material containing chemically bound calcium and fluorine with a liquid selected from the group consisting of water, dilute aqueous orthophosphoric acid, and an aqueous solution comprising essentially water, monocalcium phosphate and free orthophosphoric acid to obtain an extract solution of between about 12% and about 30% by weight of $P_2O_5$, adjusting the $CaO/P_2O_5$ mole ratio of the extract solution to between about 0.15 and about 0.6 with sulfuric acid, removing calcium sulfate from the resultant solution, drying the solution at a temperature of between about 100° C. and about 200° C., and adding water and lime to the dried material.

8. A process for producing feed grade dicalcium phosphate containing between about 45% and about 50% $P_2O_5$ and less than about .05% fluorine which comprises reacting comminuted Florida pebble phosphate with aqueous 50% to 70% sulfuric acid in the amount of between about 101% and 120% by weight of that theoretically required to produce monocalcium orthophosphate and to react with the impurities in the phosphatic material, agitating the resultant reacted mixture with sufficient water to obtain a solution containing the water-soluble phosphorus values of the reacted mixture and containing between about 12% and about 30% by weight of $P_2O_5$, adding sulfuric acid to the extract solution to adjust the $CaO/P_2O_5$ mole ratio of the solution to between about 0.15 and about 0.6, removing calcium sulfate from the resultant solution, drying the solution at a temperature between about 130° and about 180° C. to obtain a material containing between about 60% and about 65% $P_2O_5$, and adding sufficient water and lime to the dried material to obtain dicalcium phosphate.

9. A process of claim 8 wherein the acidulated phosphatic material is aged several days before preparing the extract solution therefrom.

10. A process for producing feed grade dicalcium phosphate containing less than about .05% fluorine which comprises reacting comminuted Florida phosphate rock with 60% to 70% aqueous sulfuric acid in an amount between about 101% and about 120% of that theoretically required to produce monocalcium orthophosphate and to react with the impurities of the phosphatic material, agitating the reacted mixture with sufficient liquid selected from the group consisting of water, dilute aqueous orthophosphoric acid, and an aqueous solution comprising essentially water, monocalcium phosphate and free orthophosphoric acid to obtain an extract solution of between about 12% and about 30% by weight of $P_2O_5$, separating solids from the extract solution, adding sufficient sulfuric acid to adjust the $CaO/P_2O_5$ mole ratio of the extract solution to between about 0.15 and about 0.6, removing calcium sulfate from the resultant solution, heating the resultant solution to a temperature of between about 130° and about 180° C. and holding at said temperature for between about one and about three hours, diluting the concentrated mixture with sufficient water to obtain a solution containing between about 55% and about 60% $P_2O_5$, and adding sufficient lime to the resultant solution to obtain dicalcium phosphate.

References Cited in the file of this patent

UNITED STATES PATENTS

| | | |
|---|---|---|
| 1,597,984 | La Bour | Aug. 31, 1926 |
| 1,851,210 | Palazzo et al. | Mar. 29, 1932 |
| 1,924,137 | Stokes | Aug. 29, 1933 |
| 1,972,196 | Larison | Sept. 4, 1934 |
| 2,057,956 | Kaselitz | Oct. 20, 1936 |
| 2,165,100 | Hettrick | July 4, 1939 |
| 2,384,814 | Coleman | Sept. 18, 1945 |
| 2,384,856 | Ten Eyck et al. | Sept. 18, 1945 |
| 2,504,446 | Plusje | Apr. 18, 1950 |

FOREIGN PATENTS

| | | |
|---|---|---|
| 1,435 | Great Britain | A. D. 1898 |

OTHER REFERENCES

Taggart, "Handbook of Mineral Dressing," John Wiley and Sons, New York, 1945, section 3, pp. 3–70.